United States Patent
Hintze

(10) Patent No.: US 6,907,692 B2
(45) Date of Patent: Jun. 21, 2005

(54) SPINNING VASE DEVICE AND METHOD

(76) Inventor: Karan Mari Hintze, 871 4th Ave., Sacramento, CA (US) 95818

( * ) Notice: Subject to any disclaimer, the term of this patent is extended or adjusted under 35 U.S.C. 154(b) by 0 days.

(21) Appl. No.: 10/637,266

(22) Filed: Aug. 9, 2003

(65) Prior Publication Data

US 2005/0028437 A1    Feb. 10, 2005

(51) Int. Cl.[7] .............................................. A01G 5/00
(52) U.S. Cl. ..................... 47/41.12; 47/41.01; 47/41.15
(58) Field of Search ..................... 47/15, 41.01, 41.12, 47/41.15; 446/256, 262, 263; 73/170.01, 73/170.02, 170.15

(56) References Cited

U.S. PATENT DOCUMENTS

| | | | |
|---|---|---|---|
| 674,116 A | * | 5/1901 | Kift ........................... 47/41.11 |
| 2,908,112 A | * | 10/1959 | Koistinene ................. 47/41.11 |
| 3,177,617 A | * | 4/1965 | Koistinen .................. 47/41.11 |
| 3,290,819 A | * | 12/1966 | Turner ......................... 47/41.1 |
| 4,418,496 A | | 12/1983 | Koistinen |
| 4,863,015 A | * | 9/1989 | Toltzman .................... 206/756 |
| 5,546,697 A | | 8/1996 | Lymberis et al. |
| 6,038,812 A | * | 3/2000 | Belokin et al. ............ 47/41.01 |
| 6,092,330 A | * | 7/2000 | Pratt ........................... 47/41.1 |
| 6,393,762 B1 | * | 5/2002 | Harshman et al. ......... 47/41.12 |

OTHER PUBLICATIONS

Bugcessories, Flower Kits / Flower Vases, Apr. 24, 2001—first 8 digits in the header after "web/", Bugcessories, 1 page, 2 Figures.*

* cited by examiner

Primary Examiner—Teri Pham Luu
Assistant Examiner—Bret Hayes
(74) Attorney, Agent, or Firm—Dennis A. DeBoo

(57) ABSTRACT

Spinning vase comprising a hollow member and an inner member inserted within the hollow member, the inner member comprising an ornament receiving top end for receiving a ornament such as a floral upwardly emanating beyond the open upper end of the hollow member, and a tapered bottom end terminating to a point gravity biased against a bottom interior surface of the hollow member for providing limited frictional engagement therewith such that the inner member rotates and/or spins about the point for rotating and/or spinning the floral as a function of an applied torque provided by vibration to the device or by a differential air pressure acting on the floral. A pliant bumper circumscribes the inner member for deflecting the inner member away from a sidewall of the hollow member to help sustain the rotation and/or spin of the ornament.

10 Claims, 3 Drawing Sheets

SPINNING VASE DEVICE AND METHOD

FIELD OF THE INVENTION

This invention relates generally to a spinning vase device and method and, in particularly, to a spinning ornament or floral vase device and method for a vehicle such as a VW BEETLE vehicle.

BACKGROUND OF THE INVENTION

The original VOLKSWAGEN BEETLE vehicle was first introduced at the 1939 Berlin Auto Show. The car was originally designed as a "people's car" by famed racecar designer Ferdinand Porsche. The first VOLKSWAGEN BEETLE vehicles reached the United States in 1949, and during the late 1950's, BEETLE vehicle sales and popularity increased significantly. By 1968, BEETLE vehicle sales peaked in the US at over 400,000.

Approximately 5 million BEETLE vehicles were sold in America during the 30 years that the original model was available. Globally, 22 million BEETLE vehicles were sold, making it the world's all-time best selling automobile. VOLKSWAGEN stopped importing the BEETLE vehicle into the United States in 1979 due to declining sales. The decline was a result of inferior performance and comfort as compared to other cars. VOLKSWAGEN's United States sales have dropped dramatically since the BEETLE vehicle was discontinued.

However, BEETLE mania returned to the United States in early spring 1998 when VW reintroduced the New BEETLE vehicle. Demand for the car was overwhelming. Dealers had months-long waiting lists and owners found themselves driving the most popular car on the road.

The New BEETLE vehicle was not merely an update of the original BEETLE vehicle, but a completely new and modern car. It was significantly larger and more technologically advanced than the original. The New BEETLE vehicle even came equipped with a built in flower vase on the dashboard, much to the enjoyment of the nostalgic old BEETLE vehicle owners and to a new generation. The Nostalgia phenomenon of the BEETLE vehicle is not simply about reliving a Golden Age but, also about reinterpreting it.

Accordingly, there would be great commercial promise in improving on the nostalgia of the BEETLE vehicle and in helping VOLKSWAGEN regain and surpass the glory they had as the "BEETLE Company" during the 60's and 70's.

Additionally, there would be great commercial promise in providing an amusement and/or aesthetic decorative device for vehicles which is desirable to children and adults alike.

Furthermore, there is a need for providing an amusement and/or decorative device which is of simply construction, has a relatively minimum number of parts, and is inexpensive to manufacture.

BRIEF SUMMARY OF THE INVENTION

The present invention is distinguished over the known prior art in a multiplicity of ways. For one thing, one embodiment of the invention provides a rotating and/or spinning amusement and/or decorative device in the form of spinning vase device operatively located within a vehicle and comprising a floral or ornament coupled to an inner bumper vase rotating within a vessel due to vehicle vibration and/or differential air pressures wherein the device is desirous to children and adults alike. Additionally, one embodiment of the invention provides a spinning ornament or floral vase device which is of simply construction, has a relatively minimum number of parts, and is inexpensive to manufacture.

In one embodiment of the invention, the spinning vase device is comprised of a hollow elongated member having a open upper end, a closed lower end having a bottom interior surface, and a sidewall vertically upwardly extending between the closed lower end and the open upper end, and an inner elongated member freely and at least partially inserted within the hollow elongated member, the inner elongated member comprising in combination: an ornament receiving top end for receiving a ornament such as a floral such that the floral upwardly emanates beyond the open upper end of the hollow elongated member, and a tapered bottom end terminating to a point biased by gravity against the bottom interior surface of the hollow elongated member for providing limited frictional engagement therewith such that the inner elongated member spins or rotates about the point such that the ornament rotates about a axis within the hollow elongated member as a function of an applied torque provided by vibration to the hollow elongated member or by a differential air pressure acting on the ornament for providing a spinning vase device. The device further includes a pliant bumper circumscribing the inner elongated member and at least partially inserted within the hollow elongated member for deflecting the inner elongated member away from an interior sidewall of the hollow elongated member to help sustain the spin or rotation of the ornament about the axis within the hollow elongated member as the function of the applied torque. The device further includes a motif disposed on an exterior surface of the hollow elongated member.

In another embodiment of the invention, the spinning vase device is located within an interior of a vehicle and is comprised of a hollow elongated member operatively coupled within an interior of a vehicle and having a open upper end, a closed lower end having a bottom interior surface, and a cylindrical sidewall upwardly extending between the closed lower end and the open upper end defining a hollow of the hollow elongated member, and an inner elongated member freely and at least partially inserted within the hollow of the hollow elongated member, the inner elongated member comprising in combination: an open upper end, a closed lower end, and an cylindrical sidewall upwardly extending between the closed lower end and the open upper end defining an open ended liquid impervious reservoir; an floral receiving means operatively coupled to an upper portion of the inner elongated member for closing the open ended liquid impervious reservoir and retaining the floral in an orientation such that an upper portion of the floral upwardly emanates beyond the open upper end of the hollow elongated member and a stem portion downwardly emanates into the reservoir were it is immersed in water held therein for irrigation; a tapered bottom end downwardly extending from the closed lower end and terminating to a point biased by gravity against the bottom interior surface of the hollow elongated member for providing limited frictional engagement therewith such that the inner elongated member spins or rotates the floral about a axis within the hollow elongated member as a function of an applied torque provided by vehicle vibration or by a differential air pressure within the vehicle for providing a spinning vase device located within an interior of a vehicle. The device further includes a pliant bumper circumscribing the inner elongated member and freely, and at least partially, inserted within the hollow elongated member for deflecting the inner elongated member away from an interior sidewall of the hollow elongated member to help sustain the spin and/or rotation of the floral about the axis within the hollow elongated member as the function of the applied torque provided by vehicle vibration or by the differential air pressure within the vehicle for providing amusement, entertainment, or charm to an observer thereof.

In another embodiment of the invention, a method for spinning an ornament is provided including the steps of: providing a hollow elongated member having a open upper end, a closed lower end having a bottom interior surface, and a sidewall extending between the open upper end and the closed lower end; providing an inner elongated member having an ornament receiving top end for retaining a ornament such as a floral in an upwardly emanating direction and a tapered bottom end terminating to a point; inserting the inner elongated member into the hollow elongated member such that the point of the inner elongated member is biased by gravity against the bottom interior surface of the hollow elongated member for providing limited frictional engagement therewith; spinning the ornament about an axis within the hollow elongated member as a function of an applied torque provided by a vibration applied to the hollow elongated member or by a differential air pressure applied to the ornament for providing an ornament spinning method.

Moreover, having thus summarized the invention, it should be apparent that numerous modifications and adaptations may be resorted to without departing from the scope and fair meaning of the present invention as set forth hereinbelow by the claims.

DETAILED DESCRIPTION OF THE INVENTION

Figure 1:
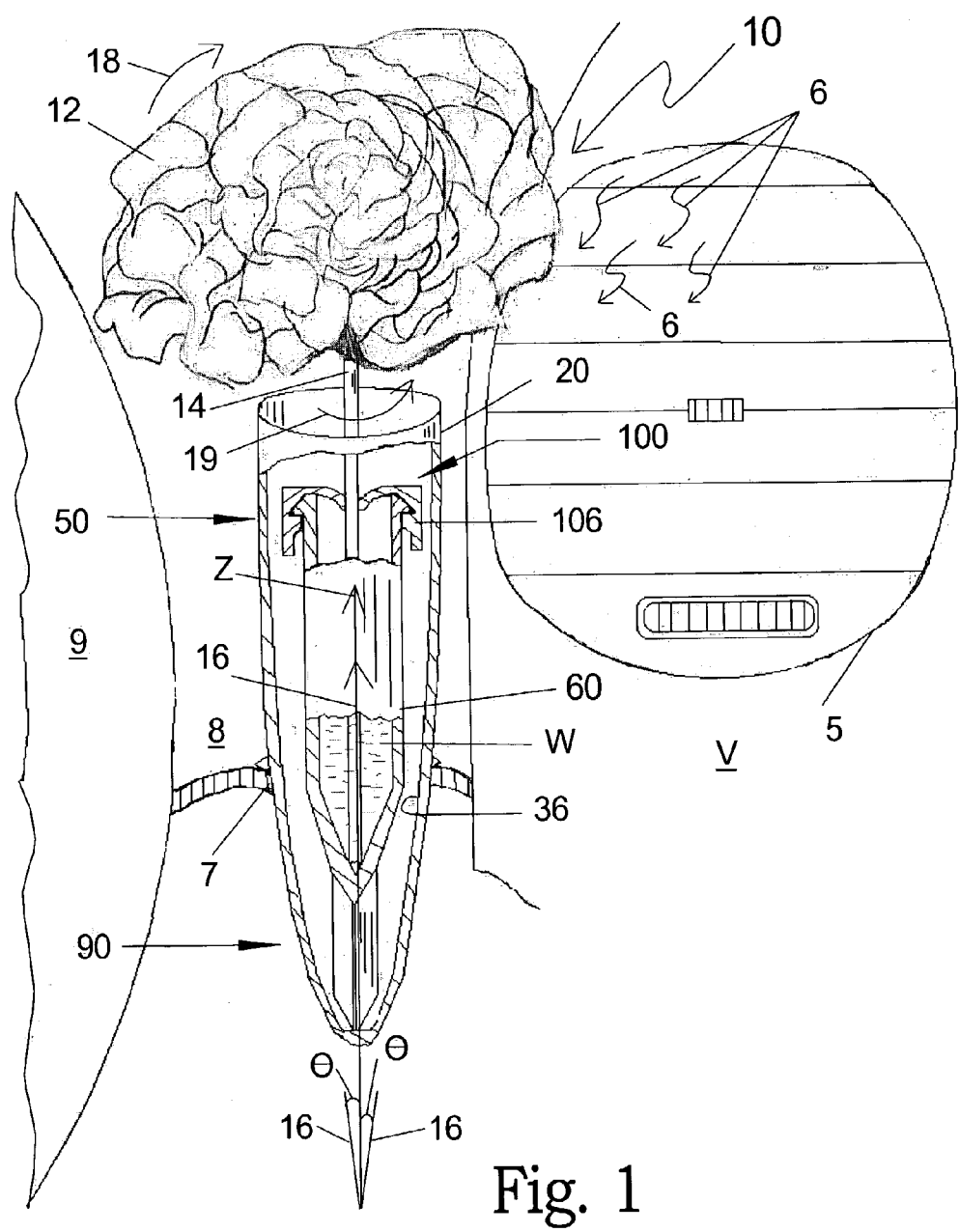
FIG. 1 is a partial cutaway front elevational view of a spinning vase device.

Considering the drawings, wherein like reference numerals denote like parts throughout the various drawing figures, reference numeral 10 is directed to a spinning vase device.

In its essence, and referring to the drawings, an embodiment of the invention provides a spinning vase device 10 operatively coupled to an interior portion of a vehicle V such as adjacent an air vent 5. The device 10 is comprised of a hollow elongated member or vessel vase 20 and an inner bumper vase 60. The inner bumper vase 60 is freely, and at least partially, inserted within said vessel vase 20 and, in one embodiment, inner bumper vase 60 includes an ornament coupling means 100 at an upper end 82 for retaining a ornament such as a floral ornament or floral 12 emanating therefrom and a tapered bottom end 90 terminating to a point 96 biased against a bottom interior surface or seat 30 of the vessel vase 20 by gravity for providing limited frictional engagement there between such that the bumper vase 60 spins and/or rotates about a axis 16 within said vessel vase 20 as a function of an applied torque provided by vehicle vibration or differential air pressure such as air 6 from the air vent 5 or air from a window wherein the spinning vase device 10 provides amusement, entertainment, and charm to an observer. The device 10 further includes a pliant bumper 106 circumscribing the inner bumper vase 60 and freely, and at least partially, inserted within the vessel vase 20 for deflecting the inner bumper vase 60 away from an interior sidewall 36 of the vessel vase 20 to help sustain the spin and/or rotation of the ornament about the axis 16 within the hollow vessel vase 20 as a function of the applied torque provided by vehicle vibration or by the differential air pressure within the vehicle for providing amusement to the observer thereof. The vessel vase 20 provides a conical envelope in which the axis 16 or floating axis 16 is free to move/and or rotate coincident with or at an acute angle (theta) about a vertical axis of the vessel vase 20 in a clockwise 18 or counter clockwise 19 direction.

Figure 2:
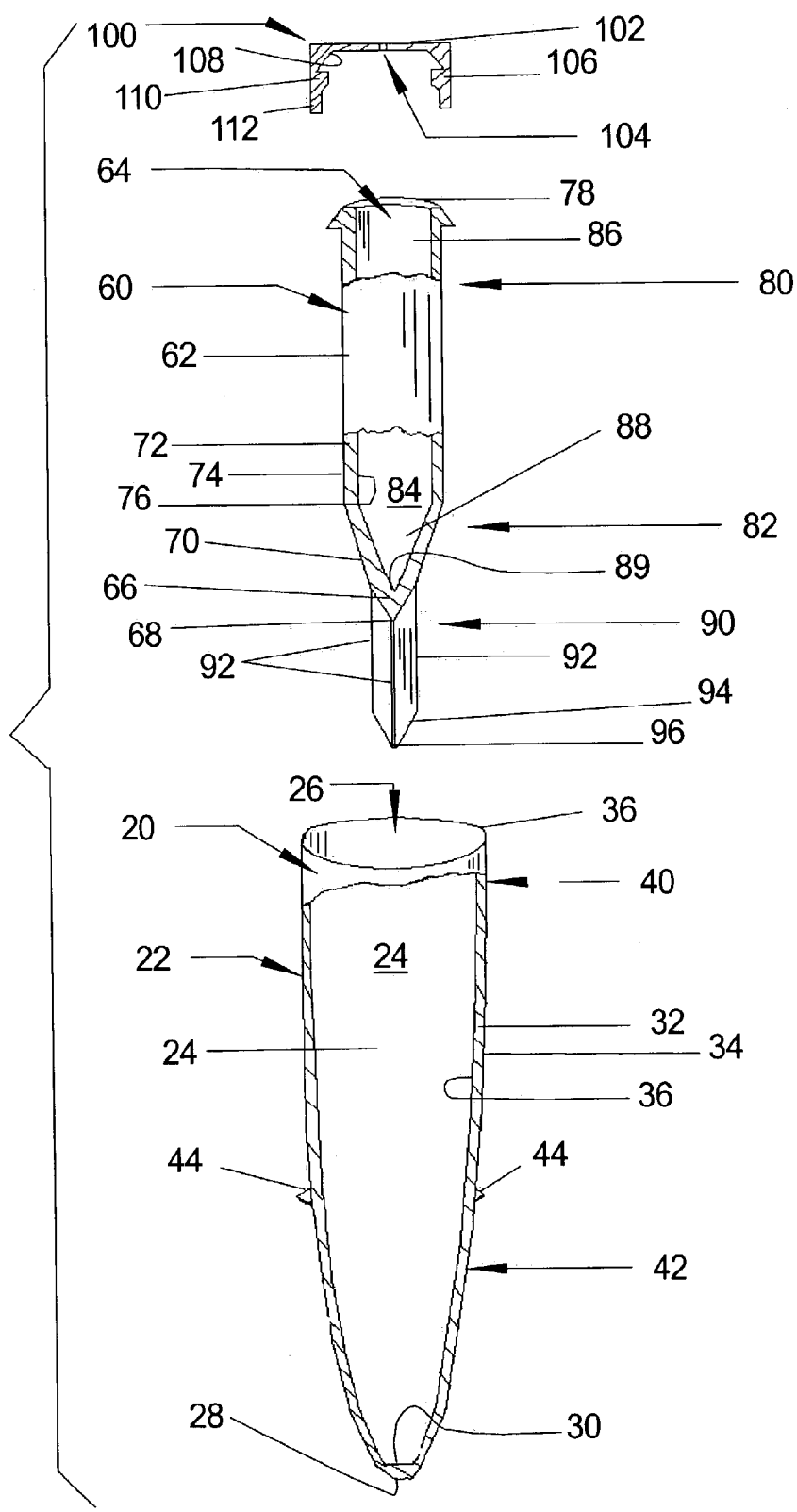
FIG. 2 is an exploded parts front elevational view showing parts of the spinning vase device in sectional and partial cutaway views.

More specifically, and referring to FIG. 2 in combination with FIG. 1, an embodiment of the invention provides a spinning vase device 10 comprised of a vessel vase 20 preferable molded from plastic and defined by a hollow elongated member 22 comprised of an internal chamber 24 circumscribed by cylindrical sidewall or sleeve 32 extending between an open upper end 26 and a closed lower end 28 having a bottom interior surface or seat 30. The cylindrical sidewall 32 is comprised of an exterior surface 34 and an interior surface 36 which continuously extend from the closed lower end 28 to the open upper end 26 where they terminate in an upper periphery 36 such that the internal chamber 24 extends between the open upper end 26 and closed lower end 28 of the vessel vase 20 and thus, defines a blind bore.

Preferably, the sidewall 32 has a generally cylindrically shaped, slightly bulbous, upper portion 40 transitioning into a downwardly convergent or conically shaped lower portion 42. The interior 36 of the sidewall 32 defines the boundaries of the internal chamber 24 which has a shape that generally corresponds to the shape of the exterior surface 34 of the sidewall 32 of vessel vase 20. That is, the internal chamber 24 has a generally cylindrically shaped, slightly bulbous, upper portion transitioning into a downwardly convergent or conically shaped lower portion.

The vessel vase 20 further includes a plurality of stops 44 radially protruding from the sidewall 32 of the vessel vase 20 for providing balance and/or precluding further travel of the vessel vase 20 when inserted into an aperture. For example, and as shown in FIG. 1, when the vessel vase 20 is inserted into a hole 7 disposed in a dashboard 8 of the vehicle V it is provided with stability and stopped from traveling further through the hole 7 by the plurality of radially extending stops 44 contacting dashboard 8 thereby securely locating device 10 at a location interposed between a steering wheel 9 of a the vehicle and at least one air vent 5 capably of blowing air such as conditioned air, heated air, or fresh or re-circulated air. In one embodiment, there are four radially extending stops 44 integrally formed with sidewall 32 at equally spaced circumferential locations.

The spinning vase device 10 further includes bumper vase 60 comprised of a hollow elongated tubular member 62. Hollow tubular member 62 includes an open upper end 64 and a closed tapered lower end 66 terminating to point 68 with a minimum diameter at a lower most portion and having a periphery 70 at an upper most portion that upwardly and outwardly tapers into an upwardly extending cylindrical sidewall or sleeve 72. Thus, the hollow elongated tubular member 62 is generally cylindrically shaped at an upper portion 80 and transitions into a downwardly progressively convergent or conically shaped lower portion 82 terminating into point 68.

The sidewall 72 includes an exterior 74 and an interior 76 that continuously extend from the tapered periphery 70 of closed lower end 66 to the open upper end 64 and terminates into an annular lip 78 circumscribing the upper open end 64. The annular lip 78 has a shape that tapers downwardly and outwardly and then, turns under toward sidewall 74 at a substantially perpendicular angle thereto for a purpose to be subsequently set forth.

The interior 76 of the sidewall 72 defines the boundaries of the hollow interior of the elongated tubular member 62 and thus, defines a reservoir 84 having a generally cylindrically shaped upper portion 86 transitioning into a downwardly convergent or conically shaped lower portion 88 terminating into a closed tapered end having a bottom interior surface or seat 89. Thus, the reservoir 84 defines a blind bore having its upper end defined by open upper end 64 and having its lower end defined by closed lower end 66.

Bumper vase 60 is further comprised of a projection 90 axially extending downwardly from the closed lower end 66 of the tubular reservoir 84 and comprising a plurality of axially extending ribs 92 each having a tapered lower end 94 terminating into a point 96 having minimum diameter. The axially extending ribs 92 are spaced circumferentially from one another to form, for example, an X, a Y, or a plus-shaped cross-sectional configuration between the lower end 66 and point 96.

Preferably, the bumper vase 60 is molded from a liquid impervious material such as a relatively rigid synthetic polymeric material, such as polyethylene, in a unitary structure which includes the tubular reservoir 84 and projection 90.

The spinning vase device 10 further includes a reservoir closure that, in one form, is a removable cap 100 fitted onto the open upper end 64 of the bumper vase 60 and which includes top wall 102 having an aperture 104 disposed there through for the reception of, for example, a stem 14 of a floral 12 wherein the stem is passed through the aperture 104 and into the reservoir 84 were it is immersed in water W held therein by the liquid impervious reservoir 84 sealed with cap 100.

The cap 100 further includes a skirt 106 downwardly depending from a periphery of the top flat wall 102 and adapted to engage upper portion 80 of bumper vase 60. Within the skirt there is provided an annular groove 108 so that the skirt below the groove constitutes an annular ridge or rib 110. The annular groove 108 is complemental in shape to the annular lip 78 of the bumper vase 60 and the two constitute a locking means providing a snap engagement for releasably securing the cap 100 upon the open top 64 of bumper vase 60. The coupling means (e.g., the closure) preferably precludes the stem from rotating thereby precluding shredding of the stem. This is particularly important to the longevity of live floral trimmings. Furthermore, an annular channel 112 is disposed within the skirt at a location below the ridge 110 for providing easy cap liftoff.

In one embodiment, the cap 100 is constructed of a resilient material (e.g., rubber, plastic, a combination of the two, or a plastic covered material such as a plastic covered foam) such that the annular groove 108 of the cap is capable of being dilated over annular lip 78 disposed at the upper end 80 of the tubular reservoir 84 to grip the upper end while allowing the stem 14 of the floral 12 to pass through aperture 104 and extend into a water filled reservoir 84 for irrigation by water W. Additionally, the skirt 106 of the cap 100 serves as a pliant bumper circumscribing said hollow elongated tubular member 62 and freely, and at least partially, inserted within the hollow elongated member 20 for deflecting the hollow elongated tubular member 62 away from the interior sidewall 26 of the hollow elongated member 20 to help sustain the spin and/or rotation of an ornament such as a floral about axis 16 within said hollow elongated member 20 as the function of the applied torque provided by vehicle vibration or by differential air pressure within the vehicle V for providing amusement, entertainment, and/or charm to the observer thereof. Accordingly, the outer surface of the skirt should be smooth or slick for providing limited frictional abatement of bumper vase movement, rotation, and/or spinning when bumping the interior surface 36 of the sidewall 32 of vessel vase 20.

In another embodiment of the invention, the cap 100 may also be pivotally connected to member 60 in any suitable manner. In another embodiment of the invention, the cap 100 may merely be configured to simply frictionally fit over the open upper end 64 of the bumper vase 60. In another embodiment of the invention, the cap 100 closing open upper end 64 may be in a form a frangible membrane which may be ruptured by forcibly inserting, for example, the stem 14 of the floral 12 therethrough, a clamping means clamping, for example, the stem 14 of the floral 12, or a cover having a plurality of radially extending resilient fingers for griping, for example, the stem 14 of the floral 12. In another embodiment of the invention, the open upper end 64 of the bumper vase 60 need not be closed and merely left open to receive an ornament or a stem of a floral.

Figure 3:
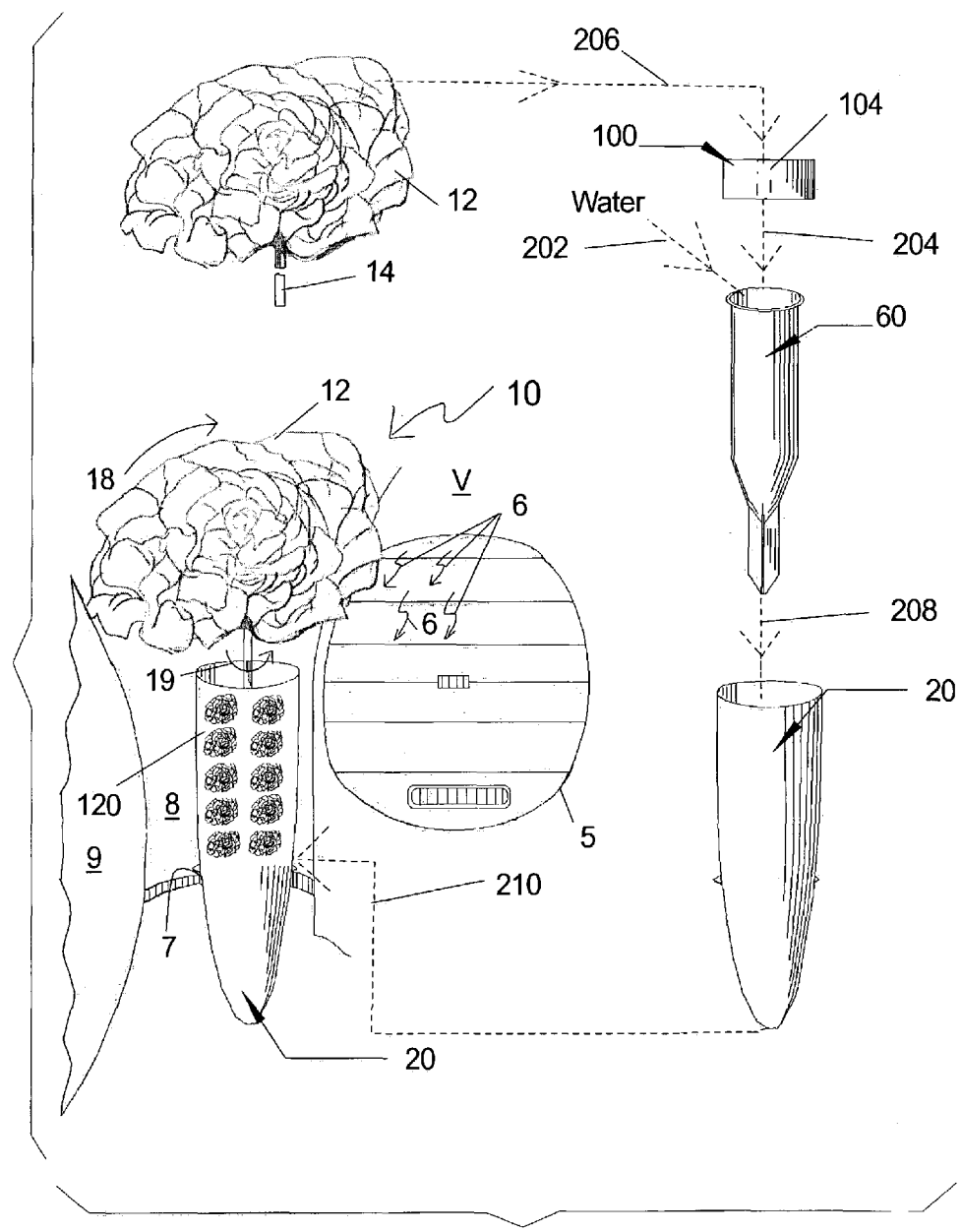
FIG. 3 is a flow diagram of one example procedure for assembling the combination of elements shown in FIG. 2 and one example for its use and operation.

Referring to FIG. 3, and in one embodiment of the invention, a design 120 such as a motif is disposed on an exterior surface 34 of the hollow elongated member 20. Specifically, a custom decorative motif is disposed on the exterior surface 34 of the hollow elongated member 20 that comprises the usage of the following materials in no set manner, but in the personal choice of the vase production designer, for each individual vase, with no set standard patterns or colors, unless specifically requested on a custom order by a dealership or personal orders from individuals. Colors, designs and patterns may be custom done to highlight, enhance, or emphasize the vehicles own interior and exterior colors. The hollow elongated member can consist of a blank surface comprising several materials, being ceramic, plastic or glass or other, and being opaque, clear, or of a solid starting color that is part of the base material, for instance colored plastic or clear plastic, white ceramic or colored ceramic, colored glass or clear glass.

Materials used to enhance the outside of the hollow elongated member to create the custom designed vase, that separates one from another, plain from decorated, standard from custom, general from personal are as follows: Paints, all colors, Papers, all designs and types, including decorative papers, and special made, fabrics, all kinds, ornamental applications which could include, non-precious materials such as sequins, beads, or mosaic glass, glitter glass, silk, or any other materials that can be attached to form a decoration on the outside of said hollow elongated member. A "Precious" stone, for example, Diamonds, will be offered and used for custom special order.

Various method embodiments of making a custom decorative motif disposed on the exterior surface 34 of the hollow elongated member 20 for different applications are as follows: Ceramic application: all ceramic vases will have colors and designs applied in a standard fashion, such as the same process for ceramic dishes or stoneware, whereas the colors and patterns are applied with ceramic paints and "fired" into the ceramic, which creates a sealed one step process, and the only other additive would be a last coating of a choice glaze which is also sealed in a "firing" process. Glass applications: All glass vases will have colors and designs applied in a similar fashion to ceramic meaning that all will be sealed within the glass embodiment itself and no outside application of decoration is furthered. Plastic Custom Vase applications: All custom decorative items used to cover the outside of said hollow elongated member, will be applied in a similar manner, excluding paint application. Decorative items, that is, papers or ornamental materials, will first be applied to the exterior of the hollow elongated member using a brush or sponge applicator and attaching to the surface with sealer/glue. This sealer/glue will be used for all product applications to the exterior as a means for adhering the decorations to the outside of the hollow elongated member. After desired effects of designs are achieved, 2 to 3 other coats of this sealer/glue will be applied, at a rate of 1.5 hours between applications. The sealer/glue will follow the complete circumference of the vase from the radially extending stops 44 to the interior 36 of the sidewall 32. After 24 hours from the last application of the sealer/glue, a final 2 coats of a permanent enamel clear gloss glaze, will be applied, at one hour between applications. Cure time after final coat of last sealant is approximately 10 days. After the 10 day cure process, decorative hollow elongated member will be safe in heat up to 350 degrees, dishwasher safe, microwave safe, and oven safe, up to this same temperature. This is needed for all cars in warm climates, where the inside of a vehicle can increase by the outside temperature by one-half in approximately 10 minutes. Paint application: Application necessary to seal any painted decorations on the outside of said hollow elongated member, is the final permanent enamel clear gloss glaze application.

In use and operation, and referring to the drawings, and specifically to FIG. 3, the device 10 is first assembled by optionally filling the reservoir 84 of the bumper vase 60 with water W at step 202, snapping on the cap 100 to the upper end 80 of the bumper vase 60 at step 204, inserting the stem 14 of the floral 12 through the aperture 104 at step 206 such that the stem extends into reservoir 84 and is irrigated with water W, inserting the bumper vase 60 into vessel vase 20 at step 208 and then, locating the vessel vase 20 in an interior of vehicle V by, for example, inserting the vessel vase 20 within the aperture 7 disposed in the dashboard 8 of the vehicle V at step 210 such that device 10 is at a location that is adjacent at least the one air vent 5 (such as that provided by models of the VOLKSWAGEN BEETLE vehicle) such that as air 6 is coming out of at least the one air vent 5 (or perhaps from an open window) and/or as the vehicle travels, the air and/or vehicle motion causes torque to be applied to the bumper vase 60. This torque is caused by a force due to the air pressure being greater on one side of the floral or ornament than on another side or by, perhaps, the vibration of the vase 60 causing cap 100 to deflect off the interior wall of vessel 20 such that liner motion is translated into rotational motion as point 96 pivots and/or rotates in seat 30 causing the floral or ornament coupled to the inner bumper vase 60 to spin and/or rotate about axis 16 in the clockwise direction 18 or the counter clockwise direction 19 for providing a amusing, entertaining, and charming spinning floral or ornament vase device 10. It has been discovered that a flower of a floral provides optimum spin when having an approximately three (3) inch diameter.

Of course, the device 10 can be coupled to other interior locations of the vehicle such that vehicle vibration or differential air pressure causes ornament or floral spinning and/or rotation in the clockwise direction 18 or the counter clockwise direction 19.

Accordingly, one aspect of one embodiment of the invention provides an inner elongated member at least partially received within a vessel and comprised of an ornament coupling means disposed at an upper end and elongated lower end terminating to a point which is gravity biased against a bottom interior surface of the vessel for providing limited frictional engagement therebetween such that the inner elongated member and thus, the ornament spins and/or rotates about an axis within the vessel as a function of an applied torque provided by vehicle vibration or differential air pressure provided by an air vent or window for providing amusement, entertainment, and/or charm to an observer.

Accordingly, one aspect of one embodiment of the invention provides a spinning ornament or floral vase device for a vehicle such as a VW BEETLE vehicle which is amusing, entertaining, and/or charming to an observer.

In an additional aspect, one embodiment of the invention provides a spinning vase device, comprising in combination: a hollow elongated member having a open upper end, a closed lower end having a bottom interior surface, and a sidewall vertically upwardly extending between the closed lower end and the open upper end, and an inner elongated member freely and at least partially inserted within the hollow elongated member, the inner elongated member comprising in combination: an ornament receiving top end for receiving a ornament such as a floral such that the floral upwardly emanates beyond the open upper end of the hollow elongated member, and a tapered bottom end terminating to a point biased by gravity against the bottom interior surface of the hollow elongated member for providing limited frictional engagement therewith such that the inner elongated member spins or rotates about the point such that the ornament rotates about a axis within the hollow elongated member as a function of an applied torque provided by vibration to the hollow elongated member or by a differential air pressure acting on the ornament for providing a spinning vase device. The device further includes a pliant bumper circumscribing the inner elongated member and at least partially inserted within the hollow elongated member for deflecting the inner elongated member away from an interior sidewall of the hollow elongated member to help sustain the spin or rotation of the ornament about the axis within the hollow elongated member as the function of the applied torque. The device further includes a motif disposed on an exterior surface of the hollow elongated member.

In a further aspect, one embodiment of the invention provides a spinning vase device located within an interior of a vehicle, comprising in combination: a hollow elongated member operatively coupled within an interior of a vehicle and having a open upper end, a closed lower end having a bottom interior surface, and a cylindrical sidewall upwardly extending between the closed lower end and the open upper end defining a hollow of the hollow elongated member, and an inner elongated member freely and at least partially inserted within the hollow of the hollow elongated member, the inner elongated member comprising in combination: an open upper end, a closed lower end, and an cylindrical sidewall upwardly extending between the closed lower end and the open upper end defining an open ended liquid impervious reservoir; an floral receiving means operatively coupled to an upper portion of the inner elongated member for closing the open ended liquid impervious reservoir and retaining the floral in an orientation such that an upper portion of the floral upwardly emanates beyond the open upper end of the hollow elongated member and a stem portion downwardly emanates into the reservoir were it is immersed in water held therein for irrigation; a tapered bottom end downwardly extending from the closed lower end and terminating to a point biased by gravity against the bottom interior surface of the hollow elongated member for providing limited frictional engagement therewith such that the inner elongated member spins or rotates the floral about a axis within the hollow elongated member as a function of an applied torque provided by vehicle vibration or by a differential air pressure within the vehicle for providing a spinning vase device located within an interior of a vehicle. The device further includes a pliant bumper circumscribing the inner elongated member and freely, and at least partially, inserted within the hollow elongated member for deflecting the inner elongated member away from an interior sidewall of the hollow elongated member to help sustain the spin and/or rotation of the floral about the axis within the hollow elongated member as the function of the applied torque provided by vehicle vibration or by the differential air pressure within the vehicle for providing amusement, entertainment, or charm to an observer thereof.

In yet further aspect, one embodiment of the invention provides a method for spinning an ornament, the steps including: providing a hollow elongated member having a open upper end, a closed lower end having a bottom interior surface, and a sidewall extending between the open upper end and the closed lower end; providing an inner elongated member having an ornament receiving top end for retaining a ornament such as a floral in an upwardly emanating direction and a tapered bottom end terminating to a point; inserting the inner elongated member into the hollow elongated member such that the point of the inner elongated member is biased by gravity against the bottom interior surface of the hollow elongated member for providing limited frictional engagement therewith; spinning the ornament about an axis within the hollow elongated member as a function of an applied torque provided by a vibration applied to the hollow elongated member or by a differential air pressure applied to the ornament for providing an ornament spinning method.

These aspects, among other things, demonstrate industrial applicability of this invention.

Moreover, having thus described the present invention, it should be apparent that numerous modifications and adaptations may be resorted to without departing from the scope and fair meaning of the present invention as set forth hereinabove and as described hereinbelow by the claims.

I claim:

1. A spinning vase device, comprising in combination:
   a hollow elongated outer member having an open upper end, a closed lower end having a bottom interior surface, and a sidewall vertically upwardly extending between said closed lower end and said open upper end, and
   an inner elongated member at least partially inserted and freely received within said hollow elongated outer member, said inner elongated member comprising in combination:
   an ornament receiving top end for receiving an ornament such that a floral ornament upwardly emanates beyond said open upper end of said hollow elongated outer member, and
   a tapered bottom end terminating to a point biased by gravity against said bottom interior surface of said hollow elongated outer member for providing limited frictional engagement therewith such that said inner elongated member spins or rotates about said point such that the floral ornament rotates about an axis within said hollow elongated outer member as a function of an applied torque provided by vibration to said hollow elongated outer member or by a differential air pressure acting on the floral ornament for providing the spinning floral vase device.

2. The device of claim 1 further including a pliant bumper circumscribing said inner elongated member and at least partially inserted within said hollow elongated outer member for deflecting said inner elongated member away from an interior sidewall of said hollow elongated outer member to help sustain the spin or rotation of said ornament about said axis within said hollow elongated outer member as the function of said applied torque.

3. The device of claim 1 further including a motif disposed on an exterior surface of said hollow elongated outer member.

4. A spinning vase device located within an interior of a vehicle, comprising in combination:
   a hollow elongated outer member operatively coupled within an interior of a vehicle and having an open upper end, a closed lower end having a bottom interior surface, and a cylindrical sidewall upwardly extending between said closed lower end and said open upper end defining a hollow of said hollow elongated outer member, and
   an inner elongated member at least partially inserted and freely received within said hollow of said hollow elongated outer member, said inner elongated member comprising in combination:
   an open upper end, a closed lower end, and a cylindrical sidewall upwardly extending between said closed lower end and said open upper end defining an open ended liquid impervious reservoir;
   a floral receiving means operatively coupled to an upper portion of said inner elongated member for closing said open ended liquid impervious reservoir and retaining a floral member in an orientation such that an upper portion of the floral member upwardly emanates beyond said open upper end of said hollow elongated outer member and a stem portion downwardly emanates into said reservoir were it is immersed in water held therein for irrigation;
   a tapered bottom end downwardly extending from said closed lower end and terminating to a point biased by gravity against said bottom interior surface of said hollow elongated outer member for providing limited frictional engagement therewith such that said inner elongated member spins or rotates said floral about an axis within said hollow elongated outer member as a function of an applied torque provided by vehicle vibration or by a differential air pressure within the vehicle for providing the spinning vase device located within the interior of the vehicle.

5. The device of claim 4 further including a pliant bumper circumscribing said inner elongated member and freely, and at least partially, inserted within said hollow elongated outer member for deflecting said inner elongated member away from an interior sidewall of said hollow elongated outer member to help sustain the spin and/or rotation of the floral member about said axis within said hollow elongated outer member as the function of the applied torque provided by vehicle vibration or by the differential air pressure within the vehicle for providing amusement, entertainment, or charm to an observer thereof.

6. The device of claim 5 wherein said ornament receiving top end is comprised of a cover operatively coupled to an upper end of said inner elongated hollow member, said cover comprising a top end having an aperture for receiving a stem of the floral member therethrough.

7. The device of claim 6 wherein said cover is a removable cap.

8. The device of claim 7 wherein said removable cap is comprised of said top end circumscribed by a downwardly depending skirt wherein said skirt defines said pliant bumper.

9. The device of claim 4 further including a motif disposed on an exterior surface of said hollow elongated outer member.

10. A method for spinning an ornament, the steps including:

providing a hollow elongated outer member having an open upper end, a closed lower end having a bottom interior surface, and a sidewall extending between the open upper end and the closed lower end;

providing an inner elongated member having an ornament receiving top end for retaining an ornament in an upwardly emanating direction and a tapered bottom end terminating to a point;

inserting the inner elongated member into the hollow elongated outer member such that said point of said inner elongated member is biased by gravity against said bottom interior surface of said hollow elongated outer member for providing limited frictional engagement therewith;

spinning the ornament about an axis within said hollow elongated outer member as a function of an applied torque provided by a vibration applied to the hollow elongated outer member or by a differential air pressure applied to the ornament for providing the ornament spinning method.

* * * * *